United States Patent [19]

Hollenbeck

[11] Patent Number: 5,513,058
[45] Date of Patent: Apr. 30, 1996

[54] DC LINK CIRCUIT FOR AN ELECTRONICALLY COMMUTATED MOTOR

[75] Inventor: Robert K. Hollenbeck, Fort Wayne, Ind.

[73] Assignee: General Electric Company, Fort Wayne, Ind.

[21] Appl. No.: 205,203

[22] Filed: Mar. 3, 1994

[51] Int. Cl.$^6$ .................................................. H02H 7/08
[52] U.S. Cl. .............................. 361/36; 361/56; 318/439
[58] Field of Search ....................... 361/36, 56, 18; 318/439, 254; 363/55

[56] References Cited

U.S. PATENT DOCUMENTS

| | | | |
|---|---|---|---|
| 3,628,110 | 12/1971 | Casaday | 318/138 |
| 3,792,329 | 2/1974 | Kuhnlein | 318/210 |
| 4,278,921 | 7/1981 | Medding et al. | 318/254 |
| 4,426,606 | 1/1984 | Suita et al. | 318/375 |
| 4,431,956 | 2/1984 | Angquist | 318/759 |
| 4,437,133 | 3/1984 | Rueckert | 361/33 |
| 4,437,325 | 3/1984 | Hershberger | 68/23.7 |
| 4,500,821 | 2/1985 | Bitting et al. | 318/254 |
| 4,532,459 | 7/1985 | Erdman et al. | 318/138 |
| 4,540,921 | 9/1985 | Boyd, Jr. et al. | 318/254 |
| 4,556,827 | 12/1985 | Erdman | 318/254 |
| 4,642,536 | 2/1987 | Boyd, Jr. et al. | 318/254 |
| 4,654,566 | 3/1987 | Erdman | 318/254 |
| 4,686,436 | 8/1987 | Archer | 318/254 |
| 4,849,845 | 7/1989 | Schmitt | 361/36 |
| 5,038,244 | 8/1991 | Tuusa | 361/36 |
| 5,247,231 | 9/1993 | Glucina | 318/380 |

FOREIGN PATENT DOCUMENTS

| | | |
|---|---|---|
| 89776/91 | 6/1992 | Australia . |
| 2057997 | 6/1992 | Canada . |

*Primary Examiner*—Todd DeBoer
*Attorney, Agent, or Firm*—Ralph E. Krisher, Jr.

[57] ABSTRACT

A protective DC link circuit connecting a motor to a power supply. The motor has a stationary assembly and a rotatable assembly in magnetic coupling relation thereto and includes windings adapted to be commutated in at least one preselected sequence. The motor also has power switches for selectively providing power to the windings in the preselected sequence by switching the power supply in connection with the windings whereby an electromagnetic field is produced for rotating the rotatable assembly. The DC link circuit connects the power supply to the power switches. The DC link circuit includes a link capacitor connected in parallel with the power supply wherein a voltage across the link capacitor defines a DC link voltage. The protective circuit also includes a comparator for detecting the DC link voltage and for generating an overvoltage signal representative of an overvoltage condition in the DC link circuit and a power switch for shunting current in the DC link circuit across the link capacitor thereby dissipating the overvoltage condition.

32 Claims, 4 Drawing Sheets

FIG_1

FIG. 2

FIG_3A

FIG_3B 5,513,058

DC LINK CIRCUIT FOR AN ELECTRONICALLY COMMUTATED MOTOR

BACKGROUND OF THE INVENTION

This invention relates to protective DC link circuits for brushless DC motors, electronically commutated motor (ECM) systems, apparatus having an ECM therein for driving a rotatable component and a circuit for controlling the DC link when the ECM generates negative torque, and methods for protecting an ECM system.

Typically, the voltage across a motor's DC link increases as the motor slows because control systems for brushless DC motors often employ regenerative braking, dynamic braking or shunt current braking techniques. These braking techniques, and others, generate negative torque for retarding rotation of the motor's rotatable assembly. Also, braking or coasting a motor which is driving a load having a certain amount of inertia may also generate negative torque. Such negative torque supplies current back into the DC link from the energy in the load and raises the voltage across a DC link capacitor as a function of its capacitance and the current. In other words, negative torque usually increases the DC link voltage. This increase in DC link voltage requires the link capacitor as well as the power switching elements to be rated for higher voltages than is necessary when the motor operates in the positive torque state.

Electronically commutated motors are described in co-assigned U.S. Pat. Nos. 4,437,325, 4,500,821, 4,532,459, 4,540,921, 4,556,827, 4,642,536, 4,654,566 and 4,686,436, the entire disclosures of which are incorporated herein by reference. These electronically commutated motors may be advantageously employed in many different fields or motor applications among which are domestic appliances, e.g., automatic washing or laundry machines such as disclosed in the aforementioned U.S. patents. Other applications for such electronically commutated motors include heating, ventilating and air conditioning systems, refrigeration systems and automobile applications, such as disclosed in commonly assigned U.S. patent application Ser. Nos. 07/889,708, 08/023,790now abandoned and 08/108,328 now Pat. No. 5423192, the entire disclosures of which are incorporated herein by reference.

SUMMARY OF THE INVENTION

Among the several objects of the present invention are to provide improved electronic control circuits, improved electronically commutated motor systems and improved methods for controlling them, improved laundry apparatus, and improved methods for protecting the DC link and other circuits; the provision of such improved circuits, systems, apparatus and methods which permit detection of overvoltage conditions in the DC link; the provision of such improved circuits, systems, apparatus and methods which permit shunting excess current in the DC link through an energy dumping resistor; and the provision of such improved circuits, systems, apparatus and methods which also are economically feasible and commercially practical.

Briefly described, a protective DC link circuit of the present invention connects a motor to a power supply. The motor has a stationary assembly and a rotatable assembly in magnetic coupling relation thereto and includes windings adapted to be commutated in at least one preselected sequence. The motor also has power switches for selectively providing power to the windings in the preselected sequence by switching the power supply in connection with the windings whereby an electromagnetic field is produced for rotating the rotatable assembly. The DC link circuit connects the power supply Ito the power switches. The DC link circuit includes a link capacitor connected in parallel with the power supply wherein a voltage across the link capacitor defines a DC link voltage. The protective DC link circuit also includes a comparator for detecting the DC link voltage and for generating an overvoltage signal representative of an overvoltage condition in the DC link and a power switch for shunting current across the link capacitor thereby dissipating the overvoltage condition.

In another form, the invention is directed to a method of protecting electrical components of a motor, including power switching devices, from overvoltage conditions. The motor has a stationary assembly and a rotatable assembly in magnetic coupling relation thereto and includes windings adapted to be commutated in at least one preselected sequence. The motor also has a plurality of power switching devices for selectively providing power to the windings in the preselected sequence by switching a power supply in connection with the windings whereby an electromagnetic field is produced for rotating the rotatable assembly. The method according to the invention includes the step of connecting the power switching devices to the power supply through a protective DC link circuit. The DC link circuit includes a link capacitor connected in parallel with the power supply wherein a voltage across the link capacitor defines a DC link voltage. The method also includes detecting the DC link voltage and generating an overvoltage signal representative of an overvoltage condition in the DC link circuit. Further, the present invention includes shunting current in the DC link circuit across the link capacitor in response to the overvoltage signal to dissipate the overvoltage condition.

Alternatively, the invention may comprise various other systems and methods.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
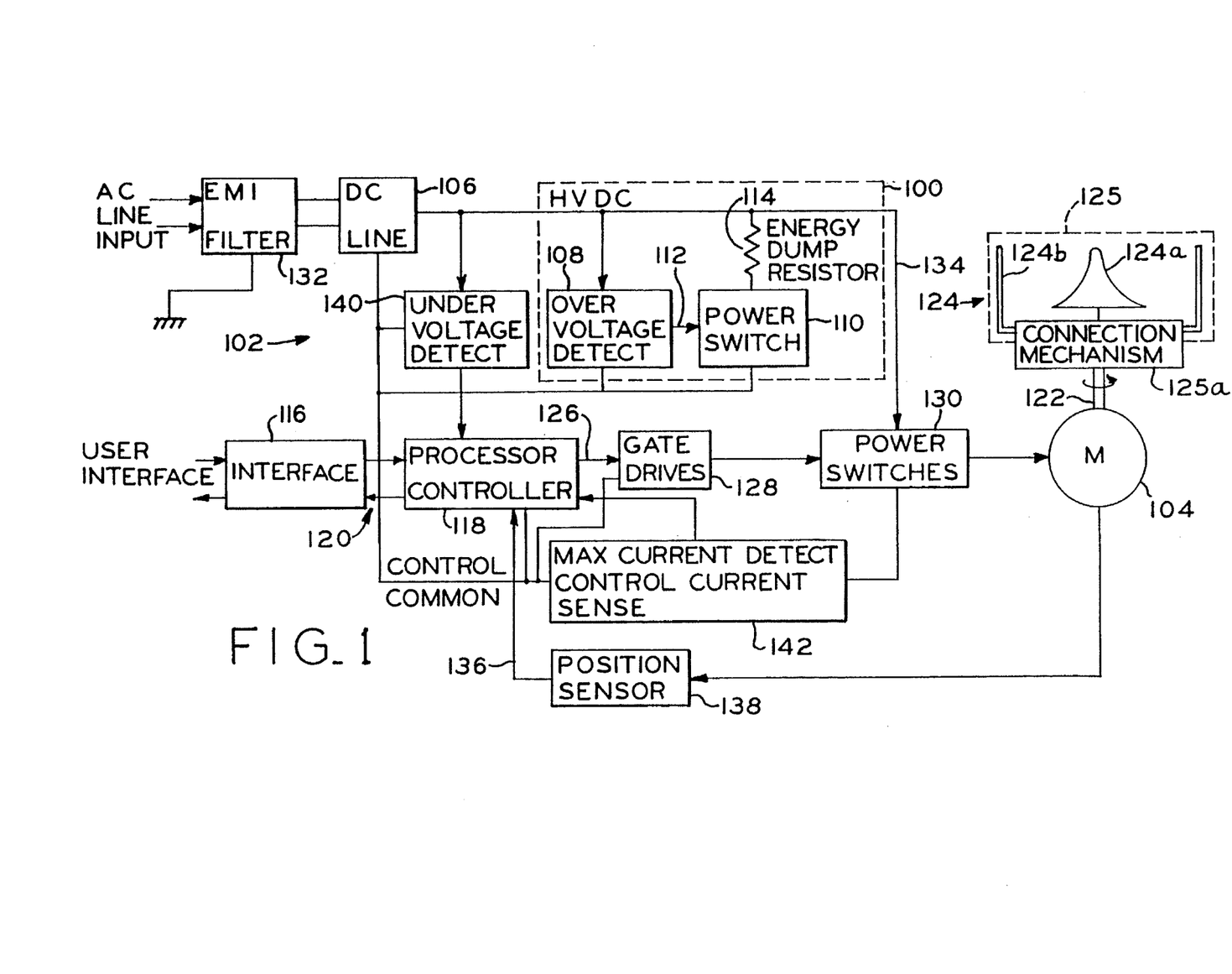
FIG. 1 is a block diagram of one preferred embodiment of an electronically commutated motor (ECM) drive control system of the invention and including DC link control circuit.

FIG. 1 shows one preferred embodiment of the present invention in the form of a control circuit 100 which is part of a drive control system 102 for a motor such as an electronically commutated motor (ECM) 104. The control circuit 100 protects, among other things, the components of a DC link 106 from overvoltages. Circuit 100 includes an overvoltage detect circuit 108 connected to a power switch 110. The power switch 110 is responsive via line 112 to the overvoltage detect circuit 108 detecting an overvoltage condition across the DC link 106. Control circuit 100 also includes an energy dump resistor 114 connected in series with switch 110.

System 102 further includes an interface 116 for providing user interface signals to a processor/controller 118 via lines 120. In a preferred embodiment, the processor 118 is embodied as an integrate processor emulator see FIGS. 3A and 3B). Processor 118 may be alternatively embodied as a universal electronically commutated motor integrated circuit (UECM IC, not shown) or an application specific integrated circuit (ASIC, not shown).

Motor 104 of the present invention has a stationary assembly, or stator (not shown), and a rotatable assembly, or rotor (not shown). The rotatable assembly is in magnetic coupling relation to the stationary assembly and mechanically connected via a shaft 122 to a particular device to be driven, such as a rotatable component 124. In a preferred embodiment of the invention, the rotatable component 124 comprises an agitator 124a and/or a basket 124b for an automatic washing or laundry machine 125. Preferably, the laundry machine includes a connection mechanism 125afor coupling rotatable component 124 to the shaft 122.

Processor 118 provides level shifted gate drive signals via line 126 for electronically controlling a plurality of gate drives 128 which provide enough voltage to switch a plurality of power switches 130. The power switches 130 are used to control rotation in the motor 104. In a preferred embodiment of the invention, gate drives 128 and power switches 130 may be embodied as an inverter bridge.

Electronically commutated DC motor 104 may be of 2, 4, 6, etc. pole construction and have 2, 3, 4 or more winding stages within the scope of the invention so as to meet at least some of the objects thereof. One preferred embodiment of the invention, includes an arrangement of power switches 130 for commutating an ECM having three winding stages (see FIG. 3B). In this embodiment, each winding stage is made up of a preselected number of sets of coils, each of which is constituted by a preselected number of winding turns of an electrical conductor.

According to a preferred embodiment of the invention, the winding stages are energized in a temporal sequence, and magnetic poles are established that will provide a radial magnetic field which moves clockwise or counterclockwise around the stator depending on at least one preselected sequence or order in which the stages are energized. This moving field intersects with the flux field of permanent magnet rotor poles to cause it to rotate relative to the stator in the desired direction. Thus, motor 104 develops a torque which is a direct function of the intensities or strengths of the magnetic fields.

Referring further to FIG. 1, an AC line input may be connected through an electromagnetic interference filter 132 to DC link 106. In this manner, system 102 provides power, through DC link 106, to operate processor 118 for driving power switches 130 by gate drives 128. The present invention also provides high voltage DC (H.V.D.C.) via line 134 to power switches 130 for commutating, windings included in the stator of motor 104.

Processor 118 generates a commutation signal via line 126 including a series of commutation pulses wherein each pulse causes a corresponding switching event of power switches 130. Power switches 130 selectively provide power to the windings of motor 104 in the preselected sequence. In this manner, processor 118 controls commutation of motor 104 to either advance or retard rotation of the rotor. If the magnetic field is rotated behind the rotor field, control system 102 of the present invention generates negative torque, and thus, negative work, for braking the rotor of motor 104. Preferably, processor 118 commands two of three windings of motor 104 to be energized at a time and pulse width modulates the power applied to at least one of the energized windings.

The winding stages of motor 104 are commutated without brushes by sensing the rotational position of the rotor as it rotates within the bore of the stator. Electrical signals generated as a function of the rotational position of the rotor are utilized sequentially to apply a DC voltage to each of the winding stages in different preselected orders or sequences that determine the direction of the rotor's rotation.

As shown in FIG. 1, processor 118 receives a signal via line 136 from a position-detecting circuit or position sensor 138. The signal via line 136 represent the rotational position of the rotor of motor 104. For example, this signal may provide information relating to back electromotive force (EMF) in the windings relating to detection of zero crossings for sensing the position the rotor of motor 104. Each of the commutation pulses of the commutation signal may correspond to a zero crossing. In other words, position sensing may be accomplished by the position sensor 138 responsive to the back EMF of the ECM 104 to provide a simulated signal via line 136 indicative of the rotational position of the rotor to control the timed sequential application of voltage to the winding stages of motor 104. Other means of position sensing may also be used. Thus, the position sensor 138 senses the position of the rotatable assembly. Processor 118 constitutes a control circuit for controlling power switches 130 in response to position sensor 138. Optionally, the position of the rotor of motor 104 can be determined without a discrete position sensor, such as by simulating motor 104 with a model and controlling rotor position by controlling current.

FIG. 1 also illustrates an undervoltage detect circuit 140 and a maximum current detect and control current sense circuit 142.

Figure 2:
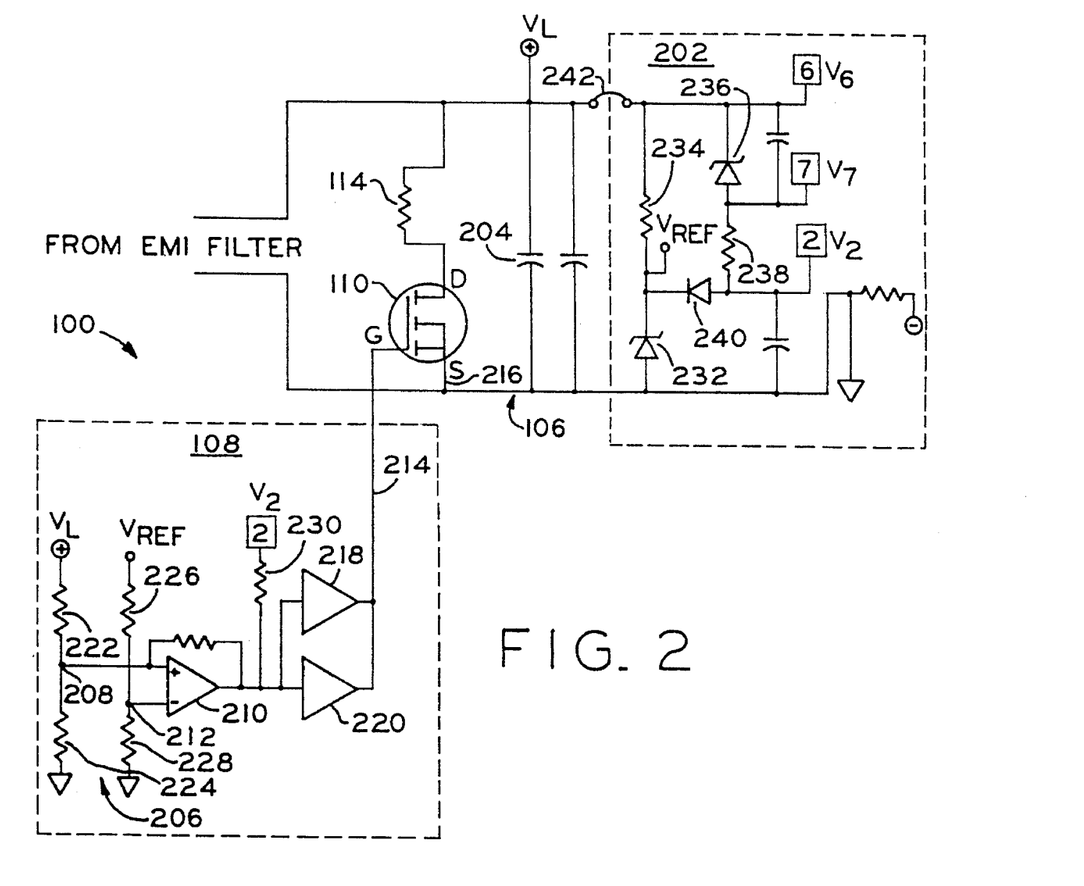
FIG. 2 is a partial schematic diagram of the DC link and the DC link control circuit of FIG. 1.

Referring to FIG. 2, a preferred embodiment of control circuit 100 includes overvoltage detect circuit 108, power switch 110 and energy dump resistor 114 which perform in combination as an overvoltage clamping circuit. Further, DC link 106 is shown including a power supply circuit 202 and a link capacitor 204 connected in parallel to DC link control circuit 100. The voltage across the link capacitor 204 defines a DC link voltage $V_L$.

As motor 104 slows, DC link 106 is subject to overvoltages. The drive control system 102 shown in FIG. 1 may commutate the windings of motor 104 to generate negative torque for retarding rotation of the rotor. This may be based on, among other things, timing algorithms to power switches 130 and load energy during negative torque braking. Also, braking or coasting motor 104 when it is driving a load having a certain amount of inertia generates negative torque. The negative torque in these circumstances supplies current back into DC link 106 from the energy in the load, thus, raising the voltage $V_L$ across DC link capacitor 204 as a function of its capacitance and the current. This produces overvoltage conditions in system 102. Such an increase in DC link voltage $V_L$ requires capacitor 204, a well as power switches 130, to be rated for higher voltages than necessary if motor 104 is operating in the positive torque state.

Control circuit 100 monitors DC link voltage $V_L$ and detects when it exceeds a predetermined reference voltage. When this occurs, a load, such as energy dump resistor 114, is placed across link voltage $V_L$. The size of the load 114 is determined by the energy that is supplied back to link capacitor 204 and value of capacitor 204.

In a preferred embodiment of the invention, overvoltage detect circuit 108 of control circuit 100 includes a voltage divider network 206 connected to DC link 106 for scaling DC link voltage $V_L$ to the voltage at node 208. The voltage divider network 206 constitutes a circuit for detecting overvoltages. Overvoltage detect circuit 108 of control circuit 100 also includes a comparator 210 connected to voltage divider network 206 for comparing the scaled DC link voltage at node 208 to a reference voltage $V_{REF}$ after it has been scaled to the voltage at node 212 by voltage divider network 206. The comparator 210 constitutes a circuit for generating an overvoltage signal representative of an overvoltage condition in DC link 106. Energy dump resistor 114 and shunting power switch 110 connected in series constitutes a circuit for shunting current in DC link 106 across link capacitor 204 thereby dissipating the overvoltage condition. In this embodiment, the a current shunting circuit is connected in parallel with capacitor 204.

Preferably, shunting power switch 110 has a conducting state and a nonconducting state and is normally in its nonconducting state and switches to its conducting state in response to, the overvoltage signal from comparator 210 via line 214. In this manner, control circuit 100 shunts excess current through resistor 114 to ground via line 216.

In a preferred embodiment, back EMF may develop in the windings of motor 104 which is a greater than the maximum desired DC link voltage $V_L$ during operation of motor 104, particularly when operating at maximum or nearly maximum speed. For example, maximum DC link voltage $V_L$ may be approximately 200 volts. When motor 104 is being driven, the generator characteristic of motor 104 does not charge DC link capacitor 204 to a higher voltage. However, as described above, link capacitor 204 may be charged by current generated when motor 104 is allowed to coast. Likewise, link capacitor 204 may be charged by braking when motor 104 operates in a negative torque mode (i.e., forcing the stator field to lag behind the rotor field to cause a retarding torque). The back EMF then generates energy which supplies current into DC link capacitor 204. Dumping this energy prevents voltage $V_L$ across DC link 106 from exceeding its desired limit (e.g., 215 volts if the voltage breakdown of power switches 130 in system 102 is 250 volts).

Resistor 114 in combination with switch 110 dumps the excess energy generated during slowing of motor 104. Preferably, switch 110 is embodied as a FET switch having its gate connected to overvoltage detecting circuit 108 via line 214 and its source connected to common or ground via line 216. Also, the drain of switch 110 preferably connects to resistor 114. Time maximum value of resistor 114 is determined by subtracting the maximum inertia calculated by the maximum of {(center of rotating mass)×(mass velocity)$^2$} from the worst case load, resetting motor 104 for maximum speed, and allowing a preset voltage rise (e.g., five volts) on DC link capacitor 204 above the overvoltage reference value $V_{REF}$.

As described above, switch 110 turns on and conducts in response to overvoltages. A pair of CMOS buffer gates 218 and 220 arranged in parallel may be used to drive the FET Rate switch 110. Voltage divider network 206 includes resistors 222 and 224 for dividing down DC link voltage $V_L$ before comparison to the scaled reference voltage $V_{REF}$. Reference voltage $V_{REF}$ is derived from an unfiltered 12 volt supply and voltage divider network 206 also includes resistors 226 and 228 for scaling the reference voltage to the voltage shown at node 212.

The output of comparator 210 goes open when the scaled DE link voltage $V_L$ is greater than the scaled reference voltage $V_{REF}$. If $V_L$ exceeds $V_{REF}$, then a pull up resistor 230 turns the input via line 214 from the CMOS buffer gates 218 and 220 to a login level high. The logic level high signal via line 214 starts switch 110 to turn on and conduct.

FIG. 2 further illustrates a power supply 202 for providing voltages $V_{REF}$ (12 volts unfiltred), $V_2$ (12 volts filtered) and $V_7$ (upper value minus 12 volts or 12 volts than $V_L$) to various portions of system 102.

Preferably, the unfiltered 12 volt supply $V_{REF}$ powers up before the other supplies so that lower FET gates 316, 320, 324. (see power switches 130 as shown FIG. 3B) of system 102 can be clamped off while the other supplies are powering up. This prevents glitches or other interference the logic elements used in the present invention from turning on the lower FET gates. Glitches, however, may be allowed on upper FET gates (see power switches 130 as shown in FIG. 3B). A zener diode 232 having current provided through a resistor 234 supplies the voltage $V_{REF}$.

The filtered 12 volt supply voltage $V_2$, supplies 12 volts power to circuits of system 102 that do not require first-on, last-off power supply. Similar to voltage $V_{REF}$, a zener diode 236 having current provided through a resistor 238 supplies voltage $V_2$. Further a diode 240 clamps the supply to a diode drop above the unfiltered voltage $V_{REF}$ by using zener diode 232.

The "upper value minus 12 volts" supply voltage $V_7$ powers the upper FET gates of system 102. The supply voltage $V_7$ is referenced to the upper DC rail through a test jumper 242. The jumper 242 is used only during tests to prevent circuit destruction when construction is faulty. Zener diode 236 and resistor 238 likewise generate supply voltage $V_7$.

Figure 3A:
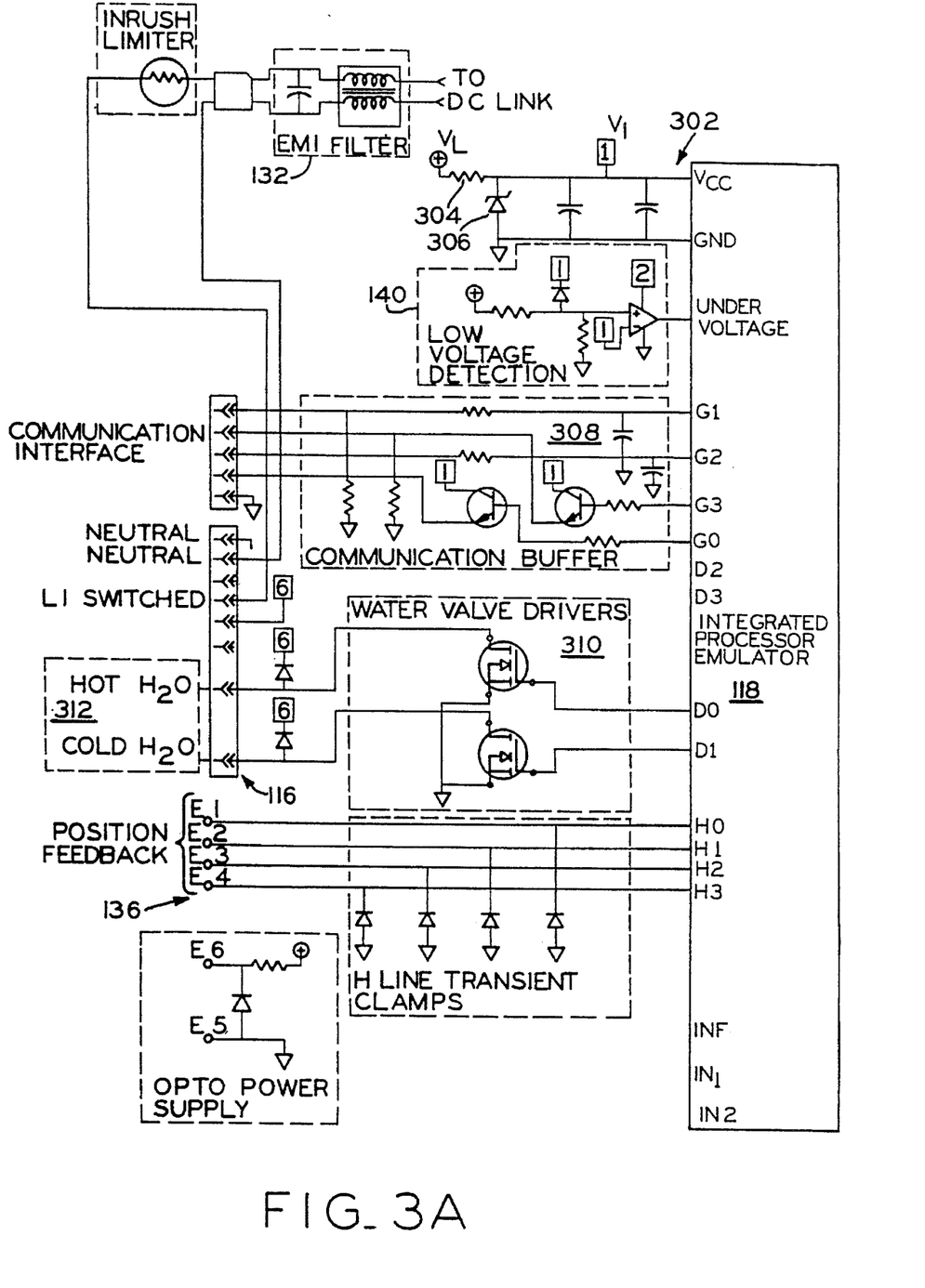
FIGS. 3A and 3B are partial schematic diagrams of the ECM drive control system of FIG. 1.
Figure 3B:
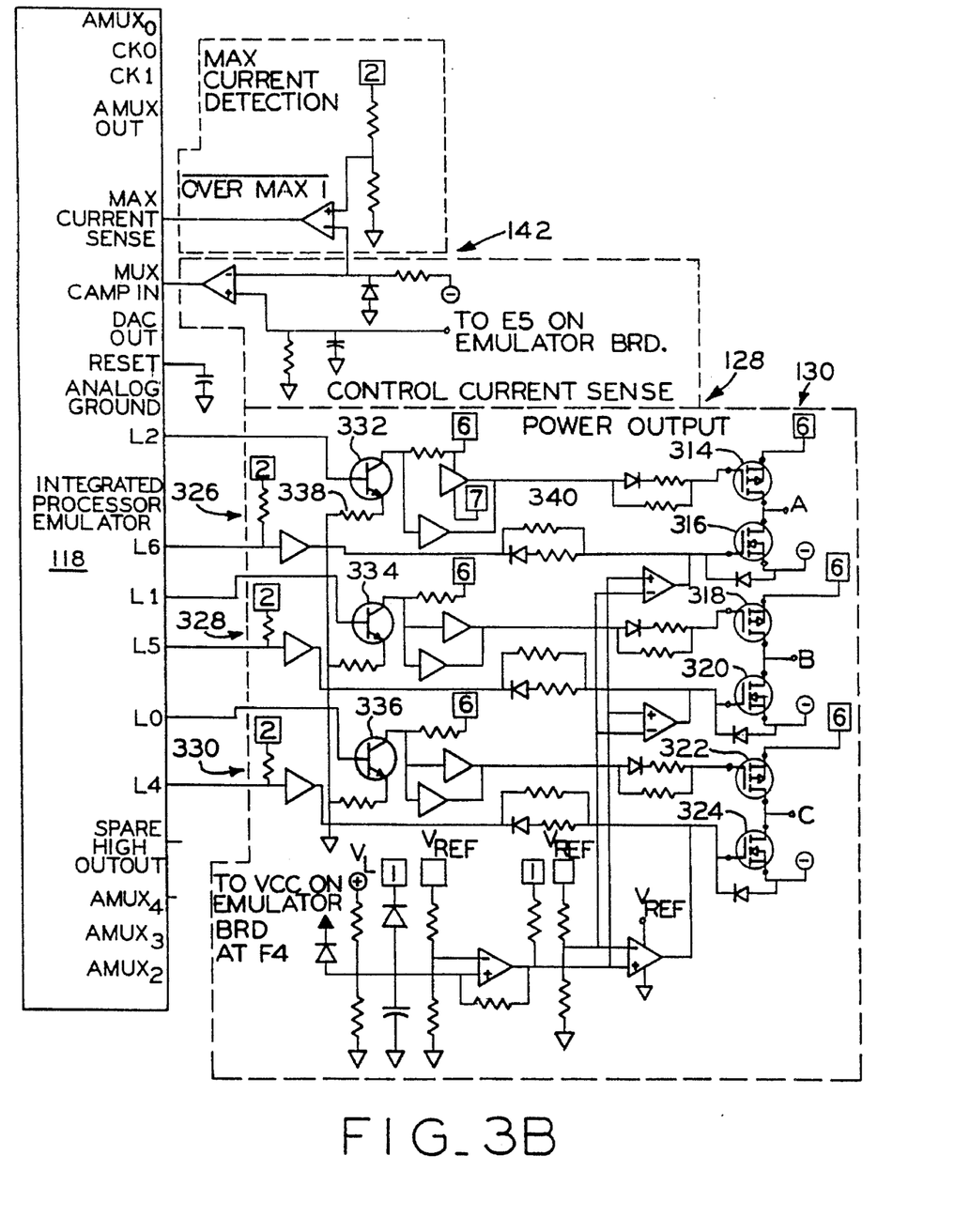

FIGS. 3A and 3B illustrate schematically a drive system for automatic laundry machine 125. As described above, the present invention is particularly advantageous in laundry machine 125 having motor 104 for driving rotatable component 124. In a preferred embodiment of the invention, rotatable component 124 may be basket 124b and/or agitator 124a included in laundry machine 125. The present invention is particularly advantageous for such a system because a fair amount of torque is necessary to rotate rotatable component 124 and the load tends to keep moving although rotatable component 124 is slowing. As such, DC link 106 is subject to overvoltages. A system for driving elevator doors provides another example of a system in which the present invention is particularly advantageous.

Laundry machine 125 may include basket 124b which is rotatable within a tub (not shown) which holds the water for washing the fabrics to be laundered, and the coaxially mounted agitator 124a, both of which are rotatable independently or jointly about their common axis. The agitator 124a and basket 124b together agitate water and fabrics to be laundered thereby to wash them and for thereafter spinning the fabrics to be laundered thereby to wash them and for thereafter spinning the fabrics to effect centrifugal displacement of water therefrom. Motor 104 is coupled selectively to agitator 124a alone during the wash cycle or mode and to both basket 124b and a agitator 124a in the spin cycle through the connection mechanism 125a. Connection mechanism 125a may comprise a fixed ratio speed reducer, such as a gear box or a pulley arrangement for instance, or in some applications shaft 122 of motor 104 could be directly coupled to agitator 124a and basket 124b. In a preferred embodiment of the invention, rotatable component 124 comprises agitator 124a and/or basket 124b.

Referring to FIG. 3A, a power supply 302 for processor 118 is schematically shown. In a preferred embodiment of the invention, a voltage $V_1$ is input to processor 118 as $V_{CC}$. The DC link voltage $V_L$ provides current through a resistor 304 for a zener diode 306 to generate the voltage $V_{CC}$. $V_{CC}$ may be preset at 5.1 volts to supply processor 118 with a simulated 20 mA.

In addition to various circuitry previously described, FIG. 3A illustrates a communication buffer circuit 308 connecting interface 116 witch processor 118. Also, this FIGURE includes a water valve driver circuit 310 for sending hot and cold water instructions from processor 118 to a hot and cold water source 312 for the laundry 125 machine.

As shown in FIG. 3B, motor 104 may include an arrangement of power switches 130 for commutating an ECM having three winding stages, indicated generally an A, B and C, respectively, each winding stage having an end terminal for connecting to the drive control system 102. The other end terminals of winding stages A, B, and C are commonly connected to a neutral line (not shown).

Processor 118 controls the output of power to the windings of motor 104 by three pairs of control lines shown at reference characters $L_0$ and $L_4$, $L_1$ and $L_5$, and $L_2$ and $L_6$. Each pair of said lines controls upper and lower cower devices, respectively, of power switches 130. In the embodiment shown in FIG 3B, control lines $L_2$ connects to an upper power device 314, embodied as a FET gate and control line $L_6$ connects to a lower power device 316, also embodied as a FET gate. Power devices 314 and 316 associated with winding stage A of motor 104. Similarly, control lines $L_1$ and $L_5$ connect to power devices 318 and 320, respectively, and control lines $L_0$ and $L_4$ connect to power devices 322 and 324, respectively. Power devices 318 and 320 are associated with winding stage B and power devices 322 and 324 are associated with winding stage C.

FIG. 3B shows each pair of power devices 314 and 316, 318 and 320, and 322 and 324 in a CMOS output stage configuration. Each CMOS output stage is connected to one winding of motor 104. For example, an upper (pull up) CMOS element such as power device 314 is connected to the positive DC supply shown as a voltage $V_6$ ($V_6$ is nominally 165 volts). FIG. 3B also schematically illustrates power switches 130 connected to drive circuits shown generally at reference characters 326, 328 and 330. Each drive circuit 326, 328 and 330 includes an NPN input transistor 332, 334 and 336, respectively, for allowing the flow of current through its associated winding stage A, B or C in a first direction. As a specific example, the base terminal of transistor 332 is connected to the control signal circuit $L_2$ to receive the control signal. The emitter of transistor 332 is connected through a resistor 338 to ground while the collector is connected through buffer circuitry 340 to the gate of FET power device 314. It can be seen that a logic high control signal on the base of transistor 332 causes positive voltage to be applied to winding stage A of motor 104.

Drive circuit 326 also includes means for allowing the flow of current through winding stage A in the opposite direction of that allowed by the transistor 332 in response to a second logic high control signal from control signal circuit $L_6$. Drive circuit 326 further includes FET power device 316 whose gate terminal is connected to circuit $L_6$ to receive the second control signal. A logic high control signal on the gate terminal results in switch 316 being thrown into conduction and winding stage A being connected to low voltage. This causes current to flow through winding stage A in the opposite direction of the current flow when the gate terminal of power device 314 is at a logic high. The control signals from processor 118 are applied to drive circuits 326, 328 and 330 in such a manner that only one upper power device for one winding stage and one lower power device for another winding stage are driving their respective winding stages at a time. This insures that current flows through a pair of series connected winding stages to generate the stator's magnetic field.

The present invention is also directed to a method of protecting electrical components of motor 104, including power switching devices 130 and DC link capacitor 204, from overvoltage conditions. A preferred embodiment of the present invention connects power switches 130 to the power supply 202 through DC link 106. The DC link 106 includes link capacitor 204 connected in parallel with the power supply 202 wherein a voltage across capacitor 204 defines DC link voltage $V_L$. The method also includes detecting DC link voltage $V_L$ and generating an overvoltage signal representative of an overvoltage condition in DC link 106. Control circuit 100 shunts current in DC link 106 across capacitor 204 in response to the overvoltage signal dissipates the overvoltage condition.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A protective DC link circuit connecting a motor to a power supply, said motor having a stationary assembly and a rotatable assembly in magnetic coupling relation thereto, said stationary assembly including windings adapted to be commutated in at least one preselected sequence, and having power switches for selectively providing power to the windings in the preselected sequence by switching the power supply in connection with the windings whereby an electromagnetic field is produced for rotating the rotatable assembly, said rotatable assembly being in driving relation to a load said load having an inertia which tends to cause excessive current in the motor when the motor is coasting and when the motor is generating a negative torque, said DC link circuit connecting the power supply to the power switches, said DC link circuit comprising:

a link capacitor connected in parallel with the power supply wherein a voltage across the capacitor defines a DC link voltage;

a voltage detecting circuit for detecting the DC link voltage;

an overvoltage circuit responsive to the voltage detecting circuit for generating an overvoltage signal representative of an overvoltage condition in the DC link circuit when the DC link voltage exceeds a reference voltage due to the excessive current caused by the inertia of the load during the coasting or negative torque generation of the motor;

a shunting circuit for selectively shunting current in the DC link circuit across the capacitor; and an actuator circuit responsive to the overvoltage signal for actuating the shunting circuit and maintaining actuation of the shunting circuit only so long as the DC link voltage exceeds the reference voltage thereby dissipating the overvoltage condition.

2. The DC link circuit of claim 1 wherein the voltage detecting circuit comprises a voltage divider network connected to the DC link circuit for scaling the DC link voltage and wherein the overvoltage circuit comprises a comparator connected to the voltage divider network for comparing the scaled DC link voltage to the reference voltage.

3. The DC link circuit of claim 1 wherein the shunting circuit comprises a resistor and a shunting switch connected in series, the shunting circuit being connected in parallel with the capacitor.

4. The DC link circuit of claim 3 wherein the switch has a conducting state and a nonconducting state and wherein the shunting switch is normally in its nonconducting state and switches to its conducting state in response to the overvoltage signal thereby to shunt excess current through the resistor to ground.

5. The DC link circuit of claim 1 wherein the reference voltage is 12 V.

6. A protective DC link circuit connecting a motor to a power supply, said motor having stationary assembly and a rotatable assembly in magnetic coupling relation thereto, said stationary assembly including windings adapted to be commutated in at least one preselected sequence, and having power switches for selective providing power to the windings in the preselected sequence by switching the power supply in connection with the windings whereby an electromagnetic field is produced for rotating the rotatable assembly, said DC link circuit connecting the power supply the power switches, said DC link circuit comprising:
- a link capacitor connected in parallel with the power supply wherein a voltage across the capacitor defines a DC link voltage;
- a voltage detecting circuit for detecting the DC link voltage;
- an overvoltage circuit responsive to the voltage detecting circuit generating an overvoltage signal representative of an overvoltage condition in the DC link circuit; and
- a shunting circuit responsive to the overvoltage signal for shunting current in the DC link circuit across the capacitor thereby dissipating the overvoltage condition, said shunting circuit including a resistor and a shunting switch connected in series said shunting circuit being connected in parallel with the capacitor, and said resistor having a predetermined resistance value as a function of maximum inertia of the rotatable assembly wherein the maximum inertia equals a maximum of {(center of rotating mass of the rotatable assembly)× (mass velocity)$_2$}.

7. A motor for driving a load, said load having an inertia which tends to cause excessive current in the motor when the motor is coasting and when the motor is generating a negative toque said motor comprising:
- a stationary assembly and a rotatable assembly in magnetic coupling relation thereto, said stationary assembly including windings adapted to be commutated in at least one preselected sequence;
- power switches for selectively providing power to the windings in the preselected sequence by switching a power supply in connection with the windings whereby an electromagnetic field is produced for rotating the rotatable assembly; and
- a protective DC link circuit connecting the power supply to the power switches, said DC link circuit comprising:
- a link capacitor connected in parallel with the power supply wherein a voltage across the capacitor defines a DC link voltage;
- a voltage detecting circuit for detecting the DC link voltage;
- an overvoltage circuit responsive to the voltage detecting circuit for generating an overvoltage signal representative of an overvoltage condition in the DC link circuit when the DC link voltage exceeds a reference voltage due to the excessive current caused by the inertia of the load during the coasting or negative torque generation of the motor;
- a shunting circuit for selectively shunting current in the DC link circuit to ground; and
- an actuator circuit responsive to the overvoltage signal for actuating the shunting circuit and maintaining actuation of the shunting circuit only so long as the DC link voltage exceeds the reference voltage thereby dissipating the overvoltage condition.

8. The motor of claim 7 wherein the voltage detecting circuit comprises a voltage divider network connected to the DC link circuit for scaling the DC link voltage and wherein the overvoltage circuit comprises a comparator connected to the voltage divider network for comparing the scaled DC link voltage to the reference voltage.

9. The motor of claim 7 wherein the shunting circuit comprises a resistor and a shunting switch connected in series, the shunting circuit being connected in parallel with the capacitor.

10. The motor of claim 9 wherein the shunting switch has a conducting state and a nonconducting state and wherein the switch is normally in its nonconducting state and switches to its conducting state in response to the overvoltage signal thereby to shunt excess current through the resistor to ground.

11. The motor of claim 9 wherein the reference voltage is 8 V.

12. The motor of claim 7 further comprising an electronically commutated motor.

13. The motor of claim 12 further comprising a position sensor for sensing the position of the rotatable assembly and a control circuit for controlling the power switches in response to the position sensor.

14. The motor of claim 13 wherein the position sensor comprises a back electromotive force (EMF) circuit for sensing the back EMF of the stationary assembly.

15. The motor of claim 13 wherein the control circuit includes a braking circuit for generating negative torque in the windings with respect to the direction of rotation of the rotatable assembly whereby the rotatable assembly is braked.

16. The motor claim 7 further comprising a pulse width modulator for pulse width modulating the power being provided to the windings of the motor.

17. A motor comprising:
- a stationary assembly and a rotatable assembly in magnetic coupling relation thereto, said stationary assembly including winding adapted to be commutated in at least one preselected sequence;
- power switches for selectively providing power to the windings in the preselected sequence by switching the power supply in connection with the windings whereby an electromagnetic field is produced for rotatinq the rotatable assembly; and
- protective DC link circuit connecting the power supply to the power switches, said DC link circuit comprising:
  - a link capacitor connected in parallel with the power supply wherein a voltage across the capacitor defines a DC link voltage;
  - a voltage detecting circuit for detecting the DC link voltage;
  - an overvoltage circuit responsive to the voltage detecting circuit for generating an overvoltage signal representative of an overvoltage condition in the DC link circuit; and a shunting circuit responsive to the overvoltage signal for shunting current in the DC link circuit across the capacitor thereby dissipating the overvoltage condition, said shunting circuit including a resistor and a shunting switch connected in series, said shunting circuit being connected in parallel with the capacitor, and said resistor having a predetermined resistance value as a function of maximum inertia of the rotatable assembly wherein the maximum inertia equals a maximum of {(center of rotating mass of the rotatable assembly)×(mass velocity)$^2$}.

18. A motor comprising:

a stationary assembly and a rotatable assembly in magnetic coupling relation thereto said stationary assembly including windings adapted to be commutated in at least one preselected sequence;

power switches for selectively providing power to the windings in the preselected sequence by switching a power supply in connection with the windings whereby an electromagnetic field is produced for rotating the rotatable assembly, said power supply including an unfiltered supply and at least one other supply, the at least one other supply having a time delay relative to the unfiltered supply whereby the unfiltered supply powers up faster than the at least one other supply, the unfiltered supply clamping the power switches off while the at least one other supply powers up thereby to prevent electrical interference from turning on the power switches when the at least one other supply powers up;

a protective DC link circuit connecting the power supply to the power switches, said DC link circuit comprising:

a link capacitor connected in parallel with the power supply Wherein a voltage across the capacitor defines a DC link voltage;

a voltage detecting circuit for detecting the DC link voltage;

an overvoltage circuit responsive to the voltage detecting circuit for generating an overvoltage signal representative of an overvoltage condition in the DC link circuit; and a shunting circuit responsive to the overvoltage signal for shunting current in the DC link circuit to ground thereby dissipating the overvoltage condition.

19. A laundering apparatus comprising:

a rotatable component; and a motor for driving the rotatable component, said rotatable component having an inertia which tends to cause excessive current in the motor when the motor is coasting and when the motor is generating a negative torque; said motor comprising:

a stationary assembly and a rotatable assembly in magnetic coupling relation thereto, the stationary assembly including windings adapted to be commutated in at least one preselected sequence, the rotatable assembly being in driving relation to the rotatable component;

power switches for selectively providing power to the windings in the preselected sequence by switching a power supply in connection with the windings whereby an electromagnetic field is produced for rotating the rotatable assembly; and a protective DC link circuit connecting the power supply to the power switches, said DC link circuit comprising:

a link capacitor connected in parallel with the power supply wherein a voltage across the capacitor defines a DC link voltage;

a voltage detecting circuit for detecting the DC link voltage;

an overvoltage circuit responsive to the voltage detecting circuit for generating an overvoltage signal representative of an overvoltage condition in the DC link circuit when the DC link voltage exceeds a reference voltage due to the excessive current caused by the inertia of the rotatable component during the coasting or negative torque generation of the motor;

a shunting circuit for selectively shunting current in the DC link circuit across the capacitor; and an actuator circuit responsive to the overvoltage signal for actuating the shunting circuit and maintaining actuation of the shunting circuit only so long as the DC link voltage exceeds the reference voltage thereby dissipating the overvoltage condition.

20. The laundering apparatus of claim 19 wherein the voltage detecting circuit comprises a voltage divider network connected to the DC link circuit for scaling the DC link voltage and wherein the overvoltage circuit comprises a comparator connected to the voltage divider network for comparing the scaled DC link voltage to the reference voltage.

21. The laundering apparatus of claim 19 wherein the shunting circuit comprises a resistor and a shunting switch connected in series, the shunting circuit being connected in parallel with the capacitor.

22. The laundering apparatus of claim 21 wherein the shunting switch has a conducting state and a nonconducting state and wherein the switch is normally in its nonconducting state and switches to its conducting state in response to the overvoltage signal thereby to shunt excess current through the resistor to ground.

23. The laundering apparatus of claim 19 wherein the reference voltage is 12 V.

24. The laundering apparatus of claim 19 wherein the motor comprises an electronically commutated motor.

25. The laundering apparatus of claim 24 wherein the electronically commutated motor comprises a position sensor for sensing the position of the rotatable assembly and a control circuit for controlling the power switches in response to the position sensor.

26. The laundering apparatus of claim 25 wherein the position sensor comprises a back electromotive force (EMF) circuit for sensing the back EMF of the stationary assembly.

27. The laundering apparatus of claim 25 wherein the control circuit includes a braking circuit for generating negative torque in the windings with respect to the direction of rotation of the rotatable assembly whereby the rotatable assembly is braked.

28. A laundering apparatus comprising:

a rotatable component; and a motor for driving the rotatable component; said motor comprising:

a stationary assembly and a rotatable assembly in magnetic coupling relation thereto the stationary assembly including windings adapted to be commutated in at least one preselected sequence the rotatable assembly being in driving relation to the rotatable component;

power switches for selectively providing power to the windings in the preselected sequence by switching a power supply in connection with the windings whereby an electromagnetic field is produced for rotating the rotatable assembly; and a protective DC link circuit connecting the power supply to the power switches, said DC link circuit comprising:

a link capacitor connected in parallel with the power supply wherein a voltage across the capacitor defines a DC link voltage;

a voltage detecting circuit for detecting the DC link voltage;

an overvoltage circuit responsive to the voltage detecting circuit for generating an overvoltage signal representative of an overvoltage condition in the DC link circuit; and a shunting circuit responsive to the overvoltage signal for shunting current in the DC link circuit across the capacitor thereby dissipating the overvoltage condition, said shunting circuit including a resistor and a shunting switch connected in series, said shunting circuit being connected in parallel with the capacitor and said resistor having a predetermined resistance value as a function of maximum inertia of the rotatable assembly wherein the maximum inertia equals a maximum of {(center of rotating mass of the rotatable assembly)×(mass velocity)$^2$}.

29. A laundering apparatus comprising:

a rotatable component; and a motor for driving the rotatable component; said motor comprising:

a stationary assembly and a rotatable assemble in magnetic coupling relation thereto, the stationary assembly including windings adapted to be commutated in at least one preselected sequence, the rotatable assembly being driving relation to the rotatable component;

power switches for selectively providing power to the windings in the preselected sequence by switching a power supply in connection with the windings whereby an electromagnetic field is produced for rotating the rotatable assembly said power supply including an unfiltered supply and at least one other supply, the at least one other supply having a time delay relative to the unfiltered supply whereby the unfiltered supply powers up faster than the at least one other supply, the unfiltered supply clamping the power switches off while the at least one other supply powers up thereby to prevent electrical interference from turning on the power switches when the at least one other supply powers up;

a protective DC link circuit connecting the power supply to the power switches said DC link circuit comprising:

a link capacitor connected in parallel with the power supply wherein a voltage across the capacitor defines a DC link voltage;

a voltage detecting circuit for detecting the DC link voltage;

an overvoltage circuit responsive to the voltage detecting circuit for generating an overvoltage signal representative of an overvoltage condition in the DC link circuit; and a shunting circuit responsive to the overvoltage signal for shunting current in the DC link circuit across the capacitor thereby dissipating the overvoltage condition.

30. A protective DC link circuit connecting a motor to a power supply, said motor driving a load which tends to cause excessive current in the motor when the motor is coasting and when the motor is generating a negative torque, said motor having a stationary assembly and a rotatable assembly in magnetic coupling relation thereto, said stationary assembly including windings adapted to be commutated in at least one preselected sequence, and having power switches for selectively providing power to the windings in the preselected sequence by switching the power supply in connection with the windings whereby an electromagnetic field is produced for rotating the rotatable assembly, said DC link circuit connecting the power supply to the power switches, said DC link circuit comprising:

a link capacitor connected in parallel with the power supply wherein a voltage across the capacitor defines a DC link voltage;

a voltage divider network connected to the DC link circuit for detecting the DC link voltage;

a comparator connected to the voltage divider network for comparing the detected DC link voltage to a reference voltage for generating an overvoltage signal representative of an overvoltage condition in the DC link circuit when the DC link voltage exceeds the reference voltage due to the excessive current caused by the inertia of the load during the coasting or negative torque generation of the motor;

a shunting switch connected in parallel with the capacitor for selectively shunting current in the DC link circuit across the capacitor; and an actuator circuit for actuating the shunting switch in response to the overvoltage signal and for maintaining actuation of the shunting switch only so long as the DC link voltage exceeds the reference voltage thereby dissipating the overvoltage condition.

31. A method for protecting electrical components of a motor, including power switching devices, from overvoltage conditions, said motor driving a load which tends to cause excessive current in the motor when the motor is coasting and when the motor is generating a negative torque, said motor having a stationary assembly and a rotatable assembly in magnetic coupling relation thereto, said stationary assembly including windings adapted to be commutated in at least one preselected sequence, and having a plurality of power switching devices for selectively providing power to the windings in the preselected sequence by switching a power supply in connection with the windings whereby an electromagnetic field is produced for rotating the rotatable assembly, the method comprising the steps of:

connecting the power switching devices to the power supply through a protective DC link circuit, said DC link circuit comprising a link capacitor connected in parallel with the power supply wherein a voltage across the capacitor defines a DC link voltage;

detecting the DC link voltage;

generating an overvoltage signal representative of an overvoltage condition in the DC link circuit when the DC link voltage exceeds a reference voltage due to the excessive current caused by the inertia of the load during the coasting or negative torque generation of the motor;

selectively shunting current in the DC link circuit across the capacitor in response to the overvoltage signal; and maintaining the shunting of current to ground only so long as the DC link voltage exceeds the reference voltage thereby dissipating the overvoltage condition.

32. A protective DC link circuit connecting a motor to a power supply, said motor having a stationary assembly and a rotatable assembly in magnetic coupling relation thereto, said stationary assembly including windings adapted to be commutated in at least one preselected sequence, and having power switching means for selectively providing power to the windings in the preselected sequence by switching the power supply in connection with the windings whereby an electromagnetic field is produced for rotating the rotatable assembly, said rotatable assembly being in driving relation to a load, said load having an inertia which tends to cause excessive current in the motor when the motor is coasting and when the motor is generating a negative torque, said DC link circuit connecting the power supply to the power switching means, said DC link circuit comprising:

a link capacitor connected in parallel with the power supply wherein a voltage across the capacitor defines a DC link voltage;

means for detecting the DC link voltage;

means responsive to the voltage detecting means for generating an overvoltage signal representative of an overvoltage condition in the DC link circuit when the DC link voltage exceeds a reference voltage due to the excessive current caused by the inertia of the load during the coasting or negative torque generation of the motor;

means for selectively shunting current in the DC link circuit across the capacitor; and means responsive to the overvoltage signal for actuating the shunting means and for maintaining actuation of the shunting means only so long as the DC link voltage exceeds the reference voltage thereby dissipating the overvoltage condition.

\* \* \* \* \*